United States Patent [19]

Stocks et al.

[11] 4,259,912

[45] Apr. 7, 1981

[54] AGRICULTURAL DISPENSING MECHANISM

[75] Inventors: Richard A. Stocks, Wisbech; David Twell, Moulton, both of England

[73] Assignee: Hestair Farm Equipment Limited, Ashford, England

[21] Appl. No.: 39,523

[22] Filed: May 16, 1979

[30] Foreign Application Priority Data

Jun. 3, 1978 [GB] United Kingdom ............... 26362/78

[51] Int. Cl.³ .............................................. A01C 7/20
[52] U.S. Cl. ......................................... 111/77; 111/69;
221/266; 222/368; 222/406; 222/414
[58] Field of Search ............................ 111/34, 77, 69;
221/260, 266; 222/414, 406, 407, 368, 279, 268

[56] References Cited

U.S. PATENT DOCUMENTS

| 1,955,368 | 4/1934 | Hoberg et al. | 222/268 X |
|---|---|---|---|
| 2,254,065 | 8/1941 | Ewerth | 111/77 UX |
| 2,605,020 | 7/1952 | Sarlls | 111/34 X |
| 3,072,301 | 1/1963 | Burke | 222/368 X |
| 3,633,331 | 1/1972 | Reichlin | 222/214 X |
| 4,002,266 | 1/1977 | Beebe | 221/260 |

FOREIGN PATENT DOCUMENTS

| 393099 | 4/1924 | Fed. Rep. of Germany | 222/414 |
|---|---|---|---|
| 2285798 | 4/1976 | France | 111/77 |
| 204754 | 10/1967 | U.S.S.R. | 221/266 |
| 1496682 | 12/1977 | United Kingdom . | |
| 1525566 | 9/1978 | United Kingdom . | |

*Primary Examiner*—Steven A. Bratlie

[57] ABSTRACT

A mechanism for dispensing seed or fertilizer, etc., for agricultural row crop implements such as seed drills and precision planters, comprises a resilient rotatable roller which cooperates with a flat vertical glass dispensing plate to dispense seed or fertilizer from a hopper through a nip between the plate and the roller. The roller is of unfoamed polyurethane formed with a honeycomb of axially extending recesses defining a relatively thin outer deflection band of the roller. The recesses give the roller the uniform and high degree of flexibility needed to accommodate a wide range of seed sizes while retaining the durability, consistency of physical characteristics and suitability for precision moulding, of unfoamed polyurethane.

4 Claims, 9 Drawing Figures

AGRICULTURAL DISPENSING MECHANISM

BACKGROUND OF THE INVENTION

This invention relates to agricultural dispensing mechanisms for dispensing agricultural particulate material, and to agricultural implements incorporating such dispensing mechanisms for delivering to the ground agricultural particulate materials such as seeds, fertilizers, herbicides, insecticides, nematicides, fungicides, slug pellets and other pesticides. Examples of such implements are seed drills, seed and fertilizer drills, fertilizer dispensers for precision rowcrop planters such as planters for maize, soya beans, potatoes etc., and rotary cultivators adapted to plant row crops.

More particularly, this invention relates to agricultural dispensing mechanisms comprising a resilient dispensing roller to dispense the agricultural particulate material.

Previous proposals relating to dispensing mechanisms having a resilient dispensing roller include proposals to use such a roller in portable hand-operated devices for spreading material such as lawn fertilizer over the entire surface of an area to be treated. The material specified for the roller in these proposals has been foam or sponge rubber, i.e. rubber expanded by gas bubbles. We have found that this material has certain operational disadvantages which are explained below, but since the standard of accuracy, consistency, and reproducibility of performance expected from devices such as portable lawn fertilizer spreaders is low, such disadvantages have not been noticeable in those particular implements.

Where dispensing rollers of expanded rubber have been tested in agricultural row crop implements such as seed drills however, the high standards of accuracy, consistency, and reproducibility of performance expected of such implements have highlighted the operational disadvantages referred to above. These disadvantages include firstly variations in the flexibility and hardness of the expanded rubber inherently arising from the method of expanding the rubber in manufacture, secondly variations in such physical characteristics of the roller as flexibility and hardness with changes in temperature during use (such temperature changes affecting the gas pockets in the rubber), thirdly variations of the physical characteristics of the roller and shrinkage of the roller with time i.e. ageing of the expanded rubber, and fourthly the susceptibility of the expanded rubber to damage by moisture (especially upon freezing) and by abrasive materials such as certain fertilizers and certain sharp seeds.

These variations in the physical characteristics of the dispensing rollers change their performance when dispensing particulate material, which is undesirable.

However, resilient roller dispensing mechanisms of the kind disclosed in British Pat. No. 1,525,566 have such significant inherent technical advantages over alternative mechanisms having rigid rollers of the peg or fluted type that the provision of an improved resilient roller in which some or all of the above mentioned disadvantages are overcome would be a valuable contribution to the art.

Improvement of the quality of the expanded rubber of the rollers itself is expensive and difficult to achieve from a production point of view, and would not remove the disadvantages inherent in the use of foam rubber anyway. Use of an unfoamed solid rubber, even of very soft rubber, nevertheless seriously restricts the versatility of the mechanism making it unsatisfactory for dispensing particles larger than small seeds. This is because the solid rubber has to be displaced by each particle dispensed and in the case of large seeds such displacement seriously distorts the roller making it either jam on adjacent structures or making it locally non-cylindrical thereby interfering with the proper dispensing of adjacent seeds, or else the forces generated by displacement of the rubber damage the seed. It is a very important feature of such a seed dispensing mechanism that it can properly handle a wide range of seed sizes.

Thus it is a broad objective of the present invention to provide an agricultural dispensing mechanism having a resilient dispensing roller for dispensing particulate material such as seed or fertilizer, the roller having better performance or life characteristics than currently available rollers of expanded rubber. More specific objectives include the provision of a roller for such a dispensing mechanism which can be more easily made to a consistent standard of performance, which is more durable in use, and which can be readily formed with an appropriate surface finish.

SUMMARY OF THE PRESENT INVENTION

The invention provides a roller type mechanism for dispensing seed or fertilizer in which the roller is of unfoamed resilient material such as polyurethane. The use of unfoamed material allows greater consistency of physical characteristics to be achieved in production and also permits ribs or the like to be moulded into the surface of the roller to promote its dispensing action. Each of the rollers is formed with a honeycomb of axially extending recesses which give the roller the flexibility to accommodate a range of seed sizes without damaging the seed.

BRIEF DESCRIPTION OF THE DRAWINGS

An embodiment of the invention will now be described by way of example with reference to the accompanying drawings in which.

DESCRIPTION OF THE PREFERRED EMBODIMENTS

Figure 1:
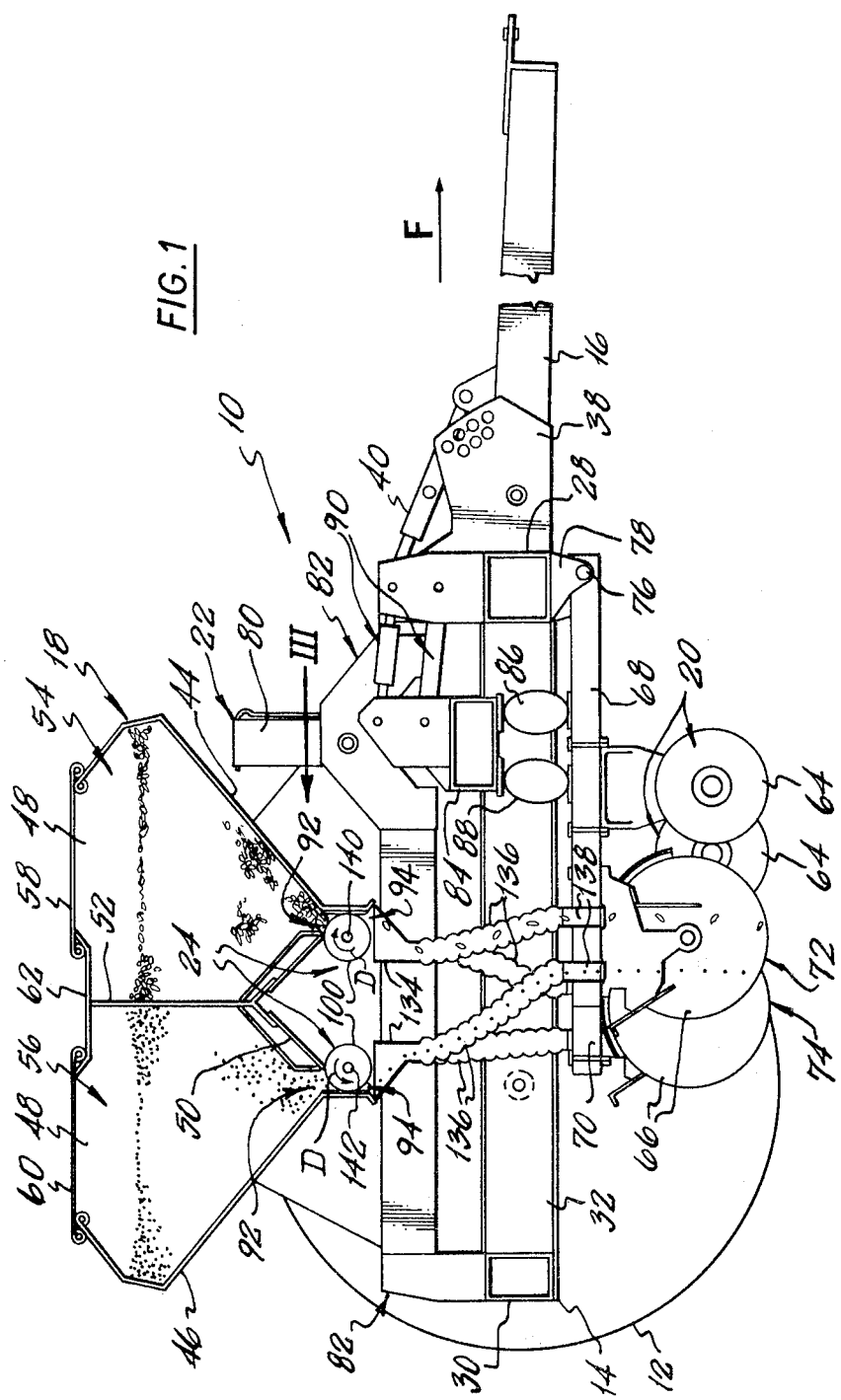
FIG. 1 shows a section through a combined seed and fertilizer drill, the section being taken in the direction F of operative forward motion of the drill.
Figure 7:
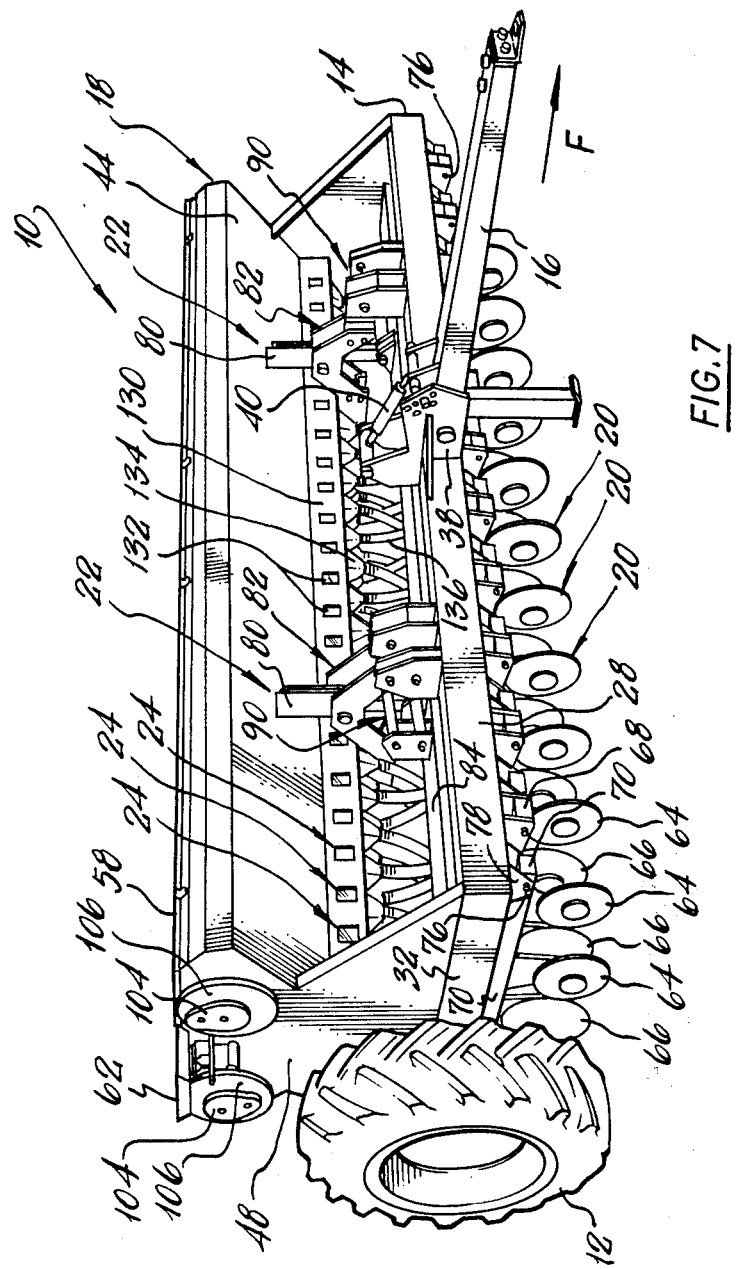
FIG. 7 is a perspective view of the seed drill of FIG. 1 to show its general arrangement and in particular the relationship of the visible glass dispensing plates to a tractor hauling the drill.

Drill 10 shown in FIGS. 1 and 7 is a "direct" or "no-till" drill intended principally for use in sowing seed into land which has not been subjected to the usual tillage operations such as plowing and harrowing after harvesting the previous crop, or which has only undergone minimum tillage. The land is usually sprayed with a weed killer such as "Gramoxone" (Trade Mark) before sowing.

As shown in the drawings, drill 10 comprises ground wheels 12, a frame 14 mounted on the ground wheels, a drawbar 16 mounted on the frame whereby the drill can be towed by a tractor, a hopper 18 for seed and fertilizer mounted on the frame, a series of coulters 20 to open furrows in the ground, actuating means 22 whereby the coulters can be raised and lowered relative to the frame, and agricultural dispensing mechanisms 24 operable in use to dispense seed and fertilizer from hopper 18 to the furrows opened by coulters 20. These principal parts of the drill will now be described in more detail.

Frame 14 comprises a rigid rectangular assembly of transverse front and rear beams 28 and 30 respectively, and fore/aft extending end beams 32. Drawbar 16 fits at its rear end between a pair of apertured flanges 38 welded to front beam 28 of frame 14. The drawbar is pivotally connected to flanges 38 and is angularly adjustable relative thereto by means of a turnbuckle 40.

Hopper 18 is mounted on frame 14 so as to extend lengthwise transverse to the direction F of operative forward motion of drill 10 across substantially the full sowing width of the drill i.e. the width of the strip of ground in which seeds are sown by the drill during each pass in a field. The hopper comprises downwardly-converging front and rear walls 44 and 46 respectively, end walls 48 and a roof-shaped partition support 50 surmounted by an upright partition wall 52 dividing the hopper into a front seed compartment 54 and a rear fertilizer compartment 56.

A pair of hinged lids 58, 60 provide access to compartments 54, 56 and are divided by a central loading platform 62.

Coulters 20 each comprise a single front slit-opening disc 64 and a pair of rear slit-widening discs 66, the three discs being journalled for rotation on a drag arm 68 or 70. Drag arms 68 are shorter than drag arms 70 and arranged alternately therewith across the sowing width of the drill and the coulters are thus arranged in two rows 72, 74 which are off-set from each other in direction F. The drag arms are pivotally connected to frame 14 by means of pivot pins 76 extending through apertured ears 78 welded to the lower side of front beam 28 of the frame.

Actuating means 22 whereby coulters 20 can be raised and lowered relative to frame 14 comprises a pair of double-acting hydraulic rams mounted by fore/aft bridge structures 82 on frame 14 in upright attitudes and at laterally spaced positions.

The lower end of the piston of each ram is pivotally connected to a transverse box-section coulter actuating beam 84 which is itself connected to the individual coulters 20 by two series of ellipsoidal rubber springs 86,88 acting on drag arms 68,70 for the transmission of down-thrust thereto.

The attitude of coulter-actuating beam 84 is maintained by means of a pair of parallelogram linkages 90.

Each dispensing mechanism 24 comprises the following principal parts:
an inlet 92 from hopper 18,
an outlet 94 for dispensed particulate material,
a passage 96 connecting the inlet to the outlet and through which particulate material can pass; and
a dispensing roller 100 mounted to cooperate with passage 96 for rotation about an axis 102 by a drive from ground wheels 12, the drive including ratio changing gear boxes 104, 106, and the roller being effective when not rotating to interrupt the flow of particulate material through passage 96 and effective when it is rotating to dispense material through outlet 94.

At the lower end of hopper partition 52 is provided a generally roof-shaped sheet metal guide and feed member 108 extending lengthwise of the hopper and having downwardly sloping walls 110 and vertical walls 112.

Vertical walls 112 of guide and feed member 108 constitute feed plates mounted above all the dispensing rollers 100 to cooperate with the rollers in defining the direction of approach to the dispensing rollers of the particulate material to be dispensed by the rollers. It will be seen that the feed plates lie in respective substantially vertical planes which are substantially parallel to the axis of rotation 102 of the dispensing rollers, and offset outwards from said axis by a small distance. The lower edges 114 of the two feed plates are positioned close to (or could, in a modification even touch) the surface of the dispensing rollers 100, and the directions D of rotation of the dispensing rollers during use are such as to oppose the passage of particulate material between the feed plates and the dispensing rollers.

The direction of offset of feed plates 112 from axes 102 of rollers 100 is such that, having regard to the directions D of rotation of rollers 100, seed or fertilizer passing from the surface of each feed plate to the surface of its dispensing roller is moved by rotation of the roller in the direction away from the top dead center position of the roller.

Feed plates 112 together with front and rear walls 44 and 46 of hopper 18 define troughs or wells 116, 118 extending lengthwise of the hopper. The wells have flat base walls 120 in which a series of oblong rectangular openings 122 (constituting inlets 92) are formed, one for each dispensing mechanism 24 and each opening 122 communicating with its passage 96 and its dispensing roller 100.

Figure 2:
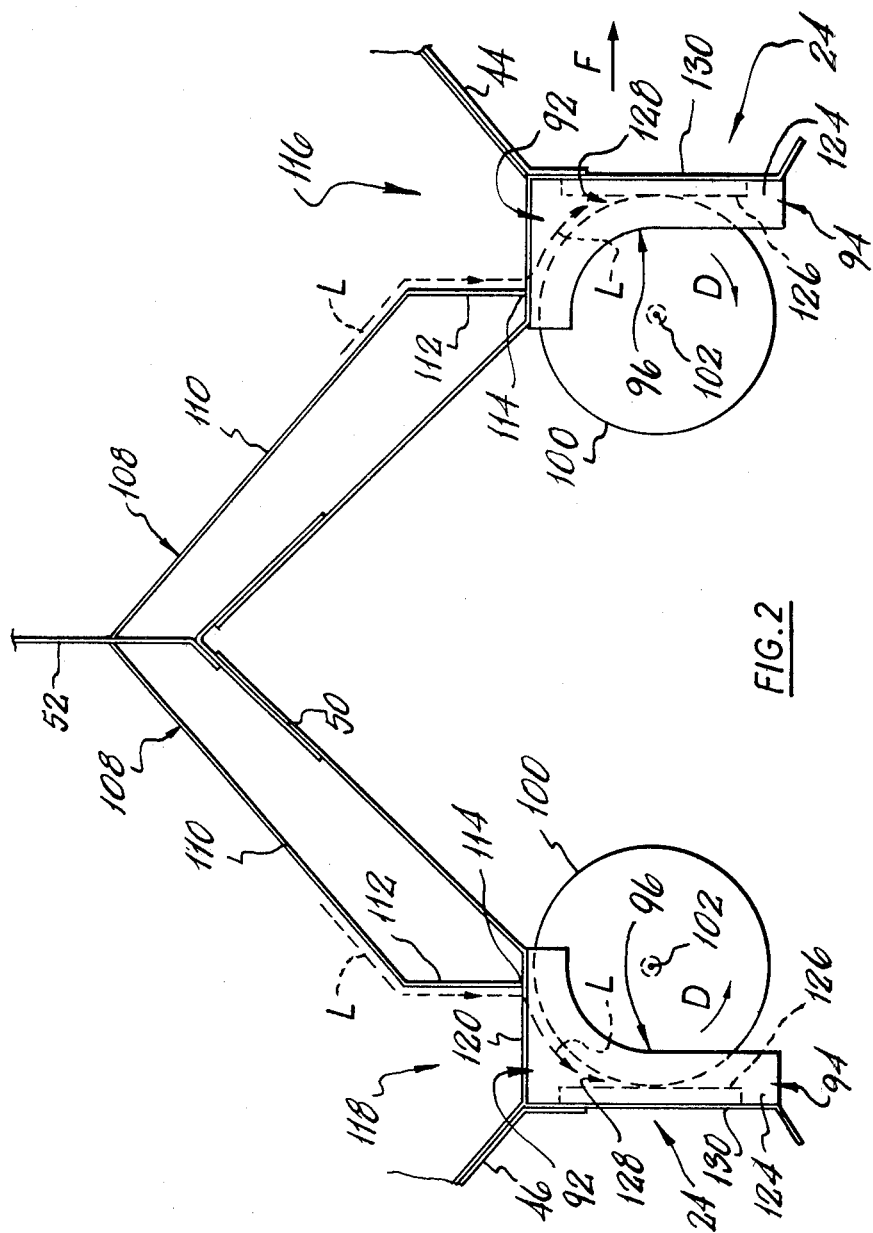
FIG. 2 shows a portion of FIG. 1 on a larger scale.

As shown in FIG. 2, the passages 96 which connect hopper 18 to outlets 94 are each defined by:
the dispensing roller 100 itself;
two generally L-shaped stainless steel side plates 124 (not shown in FIG. 3) extending downwardly from their respective opening 122, one at each lateral side edge of the dispensing roller 100; and by
a dispensing member in the form of a flat dispensing plate 126 of incompressible transparent material such as glass, the dispensing plate having a smooth surface which cooperates with its dispensing roller 100 in defining a downwardly tapering nip 128 which communicates with its opening 122 and through which particulate material from hopper 18 is dispensed by roller 100 during use.

Dispensing plates 126 are mounted in an upright attitude on a sheet metal wall 130 extending lengthwise of hopper 18 and having a series of rectangular windows 132 (FIG. 3) stamped out of it, one for each dispensing plate. The dispensing plates 126 are secured over their respective windows 132 on the inner side of wall 130.

Dispensing plates 126 on the forward side of hopper 18 are visible from a tractor drawing drill 10 and thus allow visual monitoring of the dispensing mechanisms 24 on the forward side of the hopper.

Outlets 94 for dispensed particulate material are simply defined by the lower ends of passages 96 i.e. by the lower ends of the side plates 124 and vertical walls 130, and each outlet communicates through a funnel 134 with its own flexible convoluted rubber delivery tube 136 which conducts the seed or fertilizer to drop tubes 138 through which the dispensed material passes to its furrow in the ground between slit-widening discs 66.

Dispensing rollers 100 are mounted on a pair of parallel drive shafts 140, 142 which are mounted for rotation in bearings (not shown) and drivably connected to gearboxes 104,106 which are described in British Patent Specification No. 1,496,682.

Figure 4:
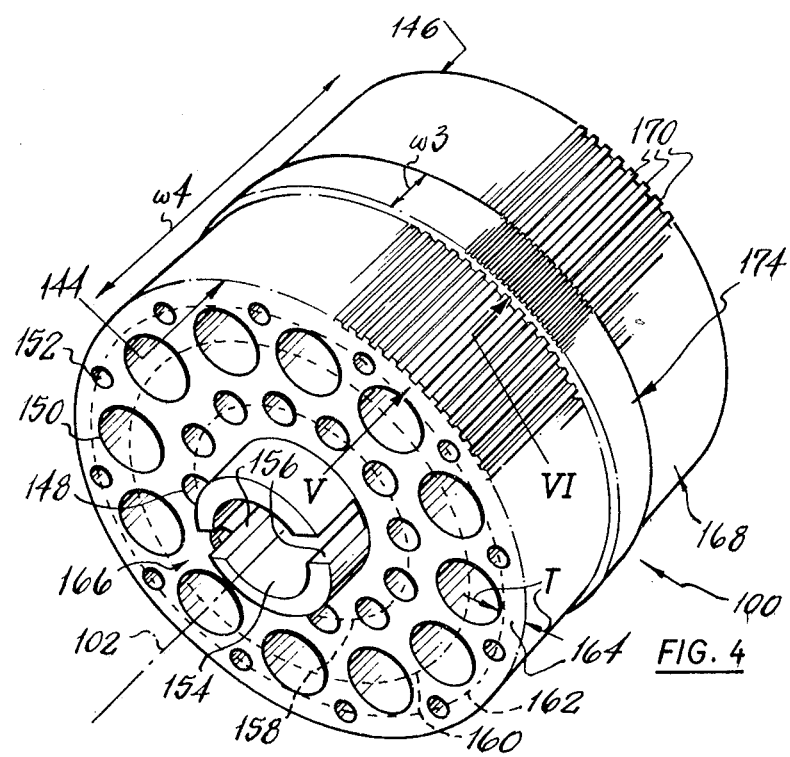
FIG. 4 shows a perspective view from one end of a dispensing roller also seen in FIGS. 1 to 3, the view from the other end being the same, and the roller is shown in FIG. 4 together with a mandrel which is slotted at one end whereby the roller is mounted on a drive shaft.

As shown in FIG. 4 each dispensing roller 100 comprises a generally cylindrical body of non-expanded (i.e. unfoamed) polyurethane (though other resilient or elastomeric material could be used). The body has inwardly dished or concave end faces 144, 146 (of maximum depth 3.2 millimeters), and three series of twelve internal recesses 148, 150, 152 are formed in it, the recesses extending lengthwise parallel to the axis 102 of rotation of the roller between the ends 144,146 of the roller.

Each recess 148, 150, 152 is of substantially uniform circular cross section (i.e. uniform cross sectional shape and area) throughout its length (when the roller is not deformed), and the recesses are distributed at substantially regular intervals around the axis 102 of rotation of the roller. The recesses of each series are all of the same size and shape.

The polyurethane of rollers 100 is of the polyester or polyether type with a cross-linking agent and is of hardness 35 degrees on the Shore A Scale and the rollers are manufactured by a casting technique. Such rollers are suitable for most seeds to be drilled, but for farmers who sow a lot of large seeds such as tick beans and broad beans a hardness of about 15 to 20 degrees on the Shore A Scale is preferred.

For mounting and driving purposes, each roller is formed with a central recess in which is bonded a mandrel 154 having slots 156 at one end. Mandrels 154 are a snug fit on shafts 140 and 142 which are drilled to receive detachable drive pins (not-shown) which fit in slots 156 and transmit drive to the roller.

The three series of twelve recesses 148,150, and 152 are arranged on respective inner, middle and outer pitch circles 158, 160 and 162 coaxial with roller 100, the pitch circle diameters being 47.7, 76.2 and 92.2 millimeters respectively. The twelve recesses on each pitch circle are equally spaced from each other, and the diameters of the recesses on the inner, middle and outer pitch circles are 8.0, 16.7 and 4.8 millimeters respectively. Inner and outer recesses 148 and 152 are radially aligned with each other and angularly offset by 15 degrees about axis 102 from the large middle recesses 150. Of course, it will be understood by those skilled in the art that numerous modifications to the size, shape and distribution of the recesses could be made while still obtaining acceptable performance from the dispensing rollers. Obviously, polygonal (such as hexagonal) section recesses could be used instead of cylindrical recesses, though the latter are simpler for manufacturing purposes.

However, one particularly significant aspect of the arrangement of recesses in roller 100 is that the large middle recesses 150 define a relatively thin outer deflection band 164 which is deflectible inwards into recesses 150 to accommodate particles (especially large seeds such as beans) being dispensed. The thickness T of deflection band 164 measured in the radial direction of dispensing roller 100 is less than the maximum cross-sectional width of the largest 150 of the recesses 148,150, 152 (i.e. their diameter in this embodiment). Deflection band 164 gives roller 100 flexibility and ability to accommodate large seeds, far in excess of that which could be obtained with a solid resilient roller and yet the roller is tough and durable.

The inner and outer recesses 148 and 152, of smaller diameter than recesses 150, are radially aligned with each other in pairs on radii passing centrally through the relatively narrow web 166 of material between successive recesses 150. Outer recesses 152 serve to render more flexible the approximately wedge-shaped outer portion of roller material between successive recesses 150, thereby rendering the inward flexibility of deflection band 164 more constant at points around the periphery of the roller. Inner recesses 148 perform a similar function in relation to the wedge-shaped inner portion of roller material between successive recesses 150, but recesses 148 are less important than recesses 152 in this respect, and could even not be provided.

Figure 5:
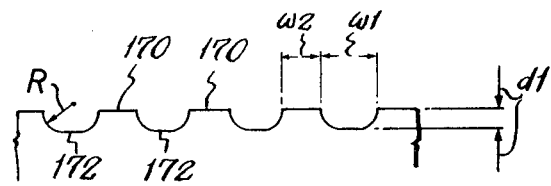
FIG. 5 shows, on a larger scale, a developed view showing a pattern of ribs and grooves formed on the peripheral surface of the dispensing roller of FIG. 4, the notional direction of viewing being indicated by arrow V in FIG. 4.
Figure 6:
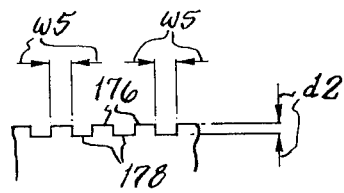
FIG. 6 shows on a larger scale a developed view showing a pattern of ribs and grooves formed on the surface of a raised slow rate band on the dispensing roller of FIG. 4, the notional direction of viewing being indicated by arrow VI in FIG. 4.

The circumferential external surface 168 of each dispensing roller 100 is cylindrical in form (when undeformed) and is formed with particulate material gripping formations in the form of ribs 170 and grooves 172 extending parallel to axis 102. The ribs and grooves are formed uniformly around the entire surface 168 of the roller. The depth d1 (see FIG. 5) of each groove 172 (or the height of each rib 170) is 0.8 millimeters, the width w1 of each groove measured in the circumferential direction with respect to the dispensing roller is 2.0 millimeters, the bottom edges of the groove being rounded with a radius R of 0.8 millimeters, and the width w2 of each rib measured in the circumferential direction with respect to the dispensing roller is 1.6 millimeters. These dimensions could be varied within the limits indicated below:
d1: 0.5 to 1.5 millimeters
w1: 1.0 to 4.0 millimeters
w2: 0.8 to 3.2 millimeters A circumferentially extending sealing formation in the form of an annular raised peripheral slow dispensing rate band 174 is formed on the external surface 168 of each roller 100. Band 174 is positioned centrally between the ends 144,146 of the roller and the width w3 of the band is one sixth of the width w4 (76.2 millimeters) of roller 100 measured at the periphery of the roller.

The diameter of roller 100 measured between the tops of the ribs 170 is 101.6 millimeters and slow rate band 174 is raised with respect to the adjacent periphery 168 of the roller by 1.6 millimeters and is formed with ribs 176 and grooves 178 extending parallel to roller axis 102, of depth d2 of 0.4 millimeters (i.e. half the depth of grooves 176) and both the ribs 176 and the grooves 178 being 1.6 millimeters in width (w5)—measured in the circumferential direction of roller 100. These dimensions could be varied within the limits indicated below:
d2: 0.2 to 0.8 millimeters
w5: 0.8 to 3.2 millimeters However it is to be understood that it is not essential to provide ribs and grooves or any other formation on roller surface 168 or on slow rate band 174 though in such circumstances it might be necessary to make provision for adjusting the rollers 100 away from dispensing plates 126 for dispensing large seeds.

Dispensing rollers 100 are positioned in relation to glass dispensing plates 126 so that slow rate bands 174 just make tangential contact with plates 126 and therefore there is a nominal 1.6 millimeter clearance between the dispensing plates and the adjacent periphery 168 of their rollers on each side of bands 174. This clearance promotes efficient dispensing action by the roller and is insufficient to permit the escape of all but very small seeds when the rollers are not rotating. Small seeds are, as is explained below, dispensed by slow rate bands 174 for which there is no clearance and therefore no seed escape.

Figure 3:
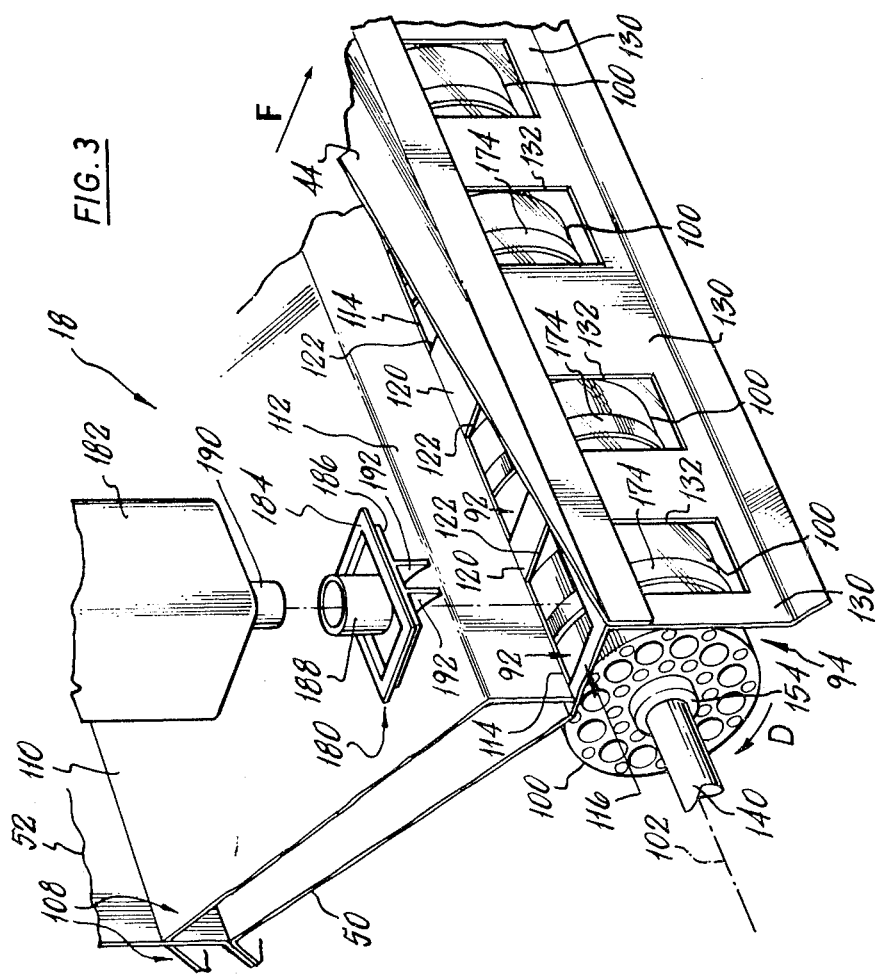
FIG. 3 shows a perspective view of a cut-away portion of the drill of FIG. 1, the direction of viewing being indicated, approximately, by arrow III in FIG. 1.

As shown in FIG. 3, a series of removable confinement members 180, one for each dispensing roller 100, may be provided to cooperate with slow rate band 174 of each roller so that when the confinement members are in position only the slow rate band of each roller is exposed to particulate material. Confinement members 180 constitute removable particulate material confinement means formed to cooperate with sealing formation 174 on each roller 100 to confine particulate material to a portion only of the axial length of the roller.

FIG. 3 shows only one confinement member 180 and its associated small seeds bottle 182, but it is to be understood that one such member and bottle may be provided for each opening 122 in the wells 116 and 118 of hopper 18.

Each confinement member 180 comprises a rectangular blanking plate 184 having a peripheral lip 186 at its underside whereby it fits into and closes its opening 122 and is held against lateral displacement. A central aperture is formed in the blanking plate, on the upper side of which is secured a collar 188 surrounding the aperture to receive the neck 190 of a secondary container in the form of small seeds bottle 182, and on the lower side of which is a pair of spaced metal confinement member flanges 192 one at each side of the aperture, each having a concave arcuate profile and proportioned to receive a portion of the periphery of roller 100 and fit on each side of slow rate band 174 in sealing relationship with the roller so far as concerns the particles to be dispensed by band 174, in this case small seeds such as kale.

Small seeds bottles 182 are of a suitable plastics material, open at the top, and of suitable capacity for the relatively small volumes of seeds to be dispensed by slow rate bands 174. The bottles are not essential for use with confinement members 180 however. If desired, collars 188 could be removed and bottles 182 eliminated so that bands 174 dispense material directly out of main hopper 18. To increase crop row spacing, certain of the blanking plates can be provided without a central aperture so as to completely blank off their dispensing rollers.

In use, coulters 20 open furrows in the ground into which dispensing mechanisms 24 dispense seed and fertilizer at constant predetermined rates.

Feed plates 112 and their associated sloping walls 110 have a remarkable and unexpected effect during operation of dispensing mechanisms 24. It has been observed during tests with a prototype having a transparent plastic hopper, that as material is dispensed by mechanisms 24, the flow of material from hopper 18 towards rollers 100 and over the upper surface of each roller into and through nip 128 is in the form of a laminar flow (see arrows L in FIG. 2) over the plates 112 and the upper roller surface, and in the case of cereal seeds such as wheat and barley, the flow is one seed thick. This laminar flow characteristic contributes remarkably to the regularity and accuracy with which dispensing mechanisms 24 operate and is of particular benefit when dispensing materials which are normally difficult to dispense, such as barley dressed with "Milstem" (Trade Mark), or oil seed rape and other oily seeds. The laminar flow is believed to derive from the inherent dispensing action of roller 100. The provision of vertical feed plates 112 promotes the laminar flow characteristic by ensuring orderly replacement of particles on the surface of the roller as it rotates. At the lower edge of each feed plate 112 particles can drop one at a time cleanly and vertically without competition on to the emerging surface of the roller in an orderly way, whereas with a non vertical feed plate there is competition between at least 3 particles for each space on the roller surface, this leading to irregularities in the dispensing action.

Rollers 100, being formed of unfoamed polyurethane are readily manufactured to a very consistent standard of physical characteristics and these characteristics remain for practical purposes substantially constant over a satisfactory life span and over a reasonable temperature range. Moreover the rollers can be made very durable, and being formed in unfoamed material do not absorb moisture and therefore are not damaged by storage in below freezing temperatures. Furthermore the rollers can be relatively easily formed with a precision surface finish appropriate to the particulate materials to be dispensed, and the use of polyurethane for the roller has advantages in itself for use in dispensing fertilizer and in resisting the chemical attack of seed dressings and fertilizer. The provision of a honeycomb arrangement of internal recesses 148,150,152 gives rollers 100 remarkably uniform resilience and flexibility at all points around their peripheries with a low spring rate, whereby the rollers gently accommodate and grip particles of any size, resiliently yielding to the shape and size of the particles as they carry them into and through nips 128 in a laminar flow.

When the removable confinement members 180 are in use, the particulate material to be dispensed is confined to slow rate band 174, the remainder of each roller 100 not being exposed to the material. Since the width of band 174 is one sixth of the width of the whole roller 100, the rate at which it dispenses is correspondingly reduced. Thus, for small seeds such as kale which need to be sown at about 3 to 4 kilogrammes per hectare the rate of rotation of rollers 100 no longer has to be reduced unduly (with attendent losses in precision as regards seed dispensing rate and uniformity) and therefore the accuracy of mechanisms 24 for dispensing at low rates is improved. Flanges 192 and raised band 174 provide excellent sealing against lateral escape of seed. Likewise, the fact that band 174 is raised allows it to seal the mechanism against escape of small seeds through the nip 128 even though a 1.6 millimeter gap is provided at the nip elsewhere along the roller, thereby providing good dispensing performance with a wide range of seed sizes.

The dispensing mechanism of the above described embodiment of the invention is noteworthy in that it is believed to be the only dispensing mechanism offering a farmer the following four important characteristics:

1. ACCURACY
2. GENTLENESS
3. VISIBILITY
4. VERSATILITY

The accuracy of the dispensing mechanism arises from the constant feed rate characteristics of the dispensing rollers 100 in association with their feed plates 112 and their dispensing plates 126. The rate of dispensing is controlled by the selected drive ratio provided by gearboxes 104, 106 between ground wheels 12 and dispensing rollers 100 and at any selected ratio the quantity of material dispensed per unit length of crop row is independent of the ground speed of drill 10.

The gentleness of the dispensing mechanism refers to the manner in which it gently holds the seeds as it dispenses them. Dispensing mechanisms using fluted rollers or peg rollers of hard plastic inevitably crack and damage some of the seeds they handle and these damaged seeds do not germinate. Dispensing rollers 100 are resilient and do not damage the seeds.

The visibility of the dispensing mechanism arises from the use of transparent dispensing plates 126 which enables visual monitoring of the dispensing process by the tractor driver from his control position.

The versatility of the dispensing mechanism refers to its ability to dispense many different types and sizes of seeds without any adaptation. The honeycomb form of the roller gives it the resilience to dispense seeds from large seeds such as beans to small seeds such as kale without changing the roller. The provision of a slow rate band 174 and associated components enables a wide variety of rates of dispensing to be provided.

Figure 8:
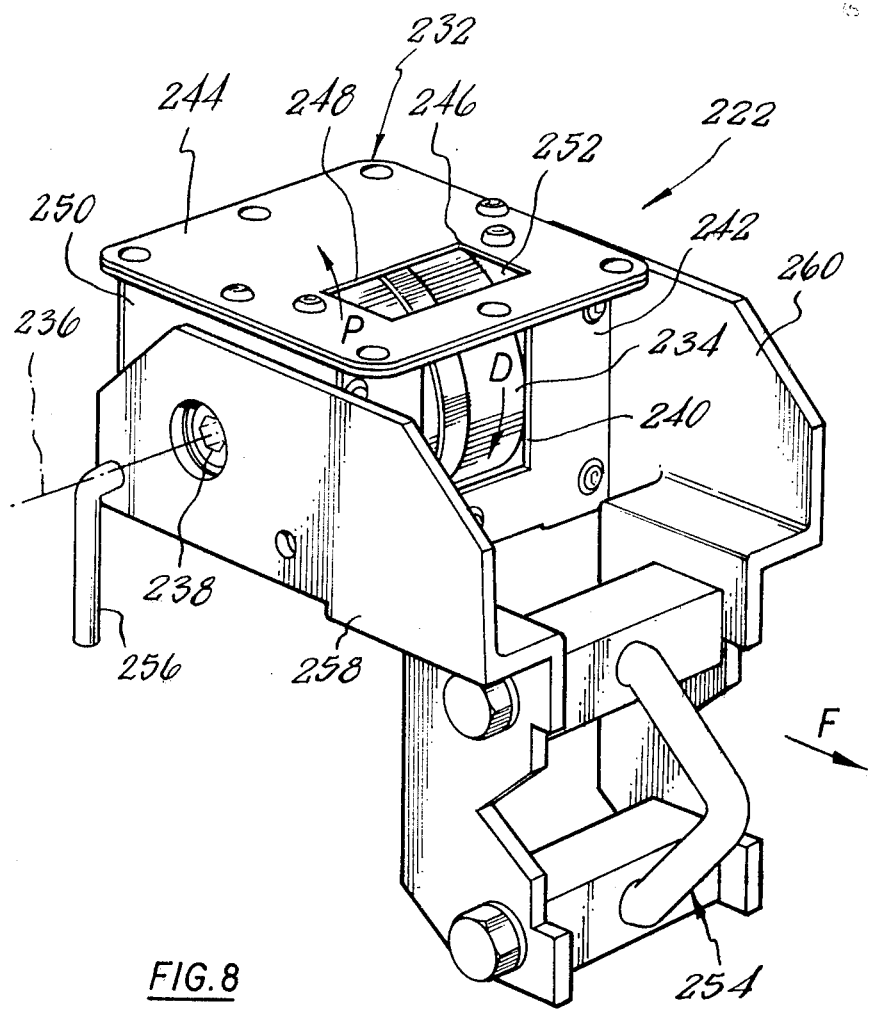
FIGS. 8 and 9 show a further application of the invention, FIG. 8 showing the dispensing drive in self contained row unit form, and FIG. 9 showing two of the row units of FIG. 8 incorporated into a two row potato planter, to dispense fertilizer.
Figure 9:
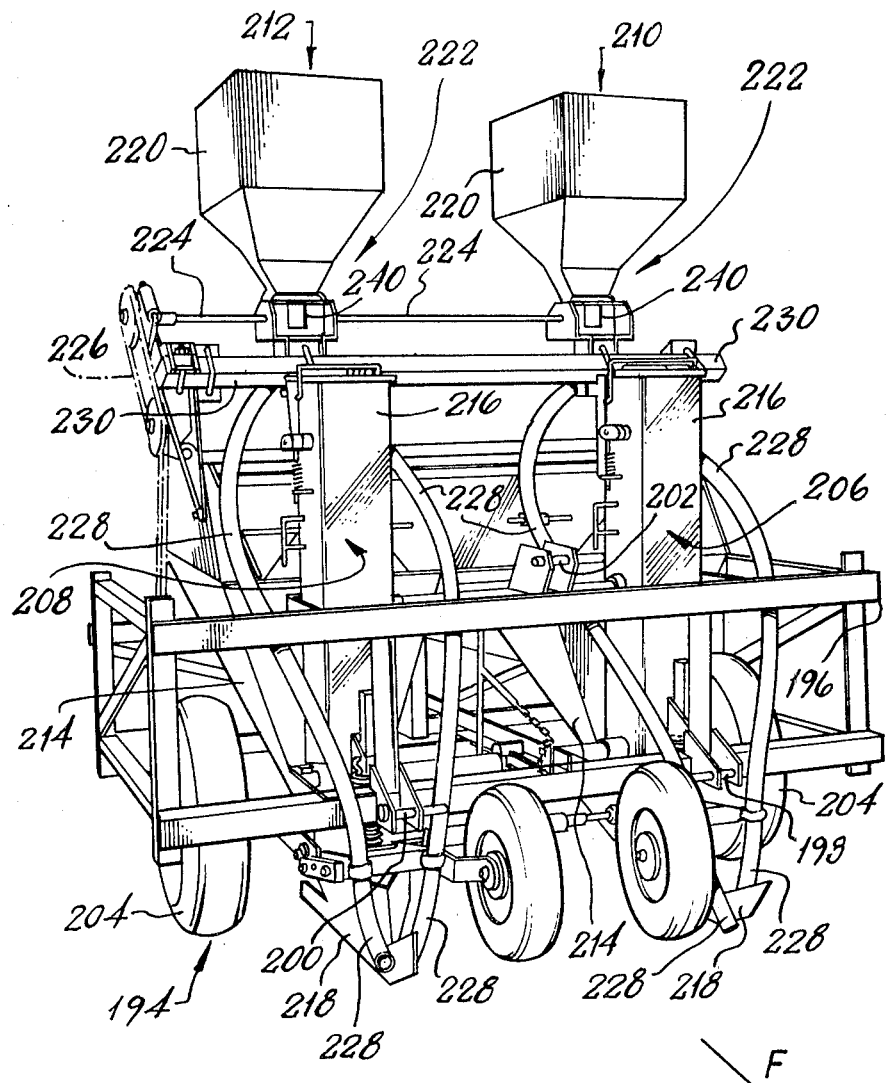

In the embodiment of FIGS. 8 and 9, FIG. 9 shows the dispensing mechanism in row unit form employed on a two row potato planter, and FIG. 8 shows details of the row unit form of the dispensing mechanism itself.

Planter 194 has a support frame 196, hitch points 198,200,202 for a tractor's hitch links, ground wheels 204, two potato row units 206, 208 and two fertilizer dispensing row units 210, 212.

Potato planting row units 206, 208 each comprise a potato hopper 214, a potato dispensing mechanism 216 driven from ground wheels 204 and furrow opening shares 218.

Fertilizer dispensing row units 210, 212 each comprise a hopper 220, a dispensing mechanism 222 driven by a hexagonal shaft 224 and a chain drive 226 from wheels 204, and twin fertilizer delivery tubes 228. Dispensing mechanisms 222 are mounted on a toolbar 230 carried by frame 196. Each pair of delivery tubes 228 is connected to a flow dividing funnel (not shown) fastened to the under side of dispensing units 222.

Each dispensing mechanism 222 comprises a box-shaped housing 232 providing a passage connecting the hopper 220 to the outlet of mechanism 222, the outlet being formed by the open bottom of housing 232, which communicates directly with the funnel (not shown) and delivery tubes 228.

A dispensing roller 234 identical to rollers 100 is mounted in housing 232 for rotation in direction D about an axis 236 transverse to the direction F of operative forward motion of planter 194 by means of drive shaft 224 which engages a hexagonal socket 238 connected to the roller.

A glass dispensing plate is mounted in a rectangular window 240 in the front wall 242 of housing 232 and the dispensing plate defines, with roller 234, a downwardly-tapering nip as in the previous embodiment.

Housing 232 has a top plate 244 in which a rectangular opening 246 corresponding to openings 122 is formed. The rear edge 248 of opening 246 is directly below the bottom edge of a vertical feed plate (not shown) provided in hopper 220 to cooperate with roller 234 and corresponding to feed plates 112.

The side walls 250, 252 of housing 232 correspond to side plates 124 in the previous embodiment.

Dispensing mechanism 222 has its own mounting means 254 for securing it to toolbar 230 and a locking pin 256 extending right through housing 232 can be withdrawn from flanges 258, 260 of mounting means 254 to permit housing 232 to be pivoted in direction P about axis 236 to an inverted position for cleaning purposes.

Dispensing mechanism 222 and its associated hopper and a delivery tube could be mounted on any agricultural or horticultural implement requiring precise dispensing of particulate material such as fertilizer. Alternatively a series of mechanisms 222 and their associated parts could be mounted on a toolbar to form a precision row crop planter.

The invention is also applicable to agricultural dispensing mechanisms of the kind comprising two in-running resilient dispensing rollers. In such a case the dispensing member cooperating with each roller 100 or 234 as described above, is a second resilient roller instead of a glass plate or the like.

We claim:

1. A mobile agricultural implement for delivering agricultural particulate materials to the ground, the implement comprising a series of dispensing mechanisms for dispensing agricultural particulate material; each of said dispensing mechanisms comprising a dispensing roller, a dispensing member mounted to cooperate with the dispensing roller in defining a nip to which, in use, agricultural particulate material to be dispensed is supplied, said dispensing roller being mounted for rotation by a drive and being effective when rotated to dispense particulate material through said nip, said dispensing roller comprising a body of nonexpanded polyurethane resilient material having formed therein a series of internal recesses which extend lengthwise parallel to the axis of rotation of the dispensing roller, each of said internal recesses being of substantially uniform cross section along its length, the recesses being distributed at substantially regular intervals around the axis of rotation of the dispensing roller, said internal recesses being arranged so as to define an outer deflection band of the dispensing roller, the thickness of the deflection band measured in the radial direction of the dispensing roller being less than the maximum cross sectional width of the largest of said recesses, said deflection band being deflectible inwards into said recesses to accommodate particles being dispensed; said mobile agricultural implement further including a hopper for said particulate material extending lengthwise transverse to the direction of operative forward motion of the implement, a series of openings formed in the region of the bottom of the hopper, one for each said dispensing mechanism, each said opening communicating with the nip between the dispensing roller and the dispensing member of its respective dispensing mechanism, two side plates being provided one at each lateral side edge of the dispensing roller, the side plates extending downwardly from their respective opening in the bottom of the hopper, the side plates and the dispensing member and the dispensing roller defining a passage containing said nip through which particulate material is dispensed in use, the lower end of the passage forming an outlet for dispensed particulate material, and said outlet communicating with one of a series of delivery tubes for the particulate material.

2. The agricultural implement of claim 1 wherein said recesses are circular in cross sectional shape.

3. The agricultural implement of claim 1 wherein said recesses include recesses of at least two different cross sectional areas.

4. The agricultural implement of claim 1 wherein said recesses are arranged on at least two pitch circles, both of said pitch circles being co-axial with the dispensing roller, the recesses on one pitch circle being angularly offset about the axis of rotation of the dispensing roller from the recesses on the other pitch circle.

* * * * *